(12) United States Patent  
Singh et al.

(10) Patent No.: US 11,550,509 B2  
(45) Date of Patent: Jan. 10, 2023

(54) METHOD AND APPARATUS FOR ADAPTIVE DATA TRANSFER IN A MEMORY SYSTEM

(71) Applicant: Samsung Electronics Co., Ltd., Suwon-si (KR)

(72) Inventors: Abhishek Kumar Singh, Bangalore (IN); Ekansh Gupta, Bangalore (IN); Manjunath Jayram, Bangalore (IN); Yunas Rashid, Bangalore (IN); Mahantesh Mallikarjun Kothiwale, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/281,417

(22) PCT Filed: Oct. 1, 2019

(86) PCT No.: PCT/KR2019/012855  
§ 371 (c)(1),  
(2) Date: Mar. 30, 2021

(87) PCT Pub. No.: WO2020/071745  
PCT Pub. Date: Apr. 9, 2020

(65) Prior Publication Data  
US 2022/0043603 A1 Feb. 10, 2022

(30) Foreign Application Priority Data

Oct. 1, 2018 (IN) .............................. 201841037099  
Sep. 27, 2019 (IN) ............................ 2018 41037099

(51) Int. Cl.  
*G06F 3/06* (2006.01)

(52) U.S. Cl.  
CPC ............ *G06F 3/0659* (2013.01); *G06F 3/065* (2013.01); *G06F 3/0613* (2013.01); *G06F 3/0683* (2013.01)

(58) Field of Classification Search  
CPC ...... G06F 3/0659; G06F 3/0613; G06F 3/065; G06F 3/0683  
See application file for complete search history.

(56) References Cited

U.S. PATENT DOCUMENTS

2002/0133645 A1 9/2002 Ku  
2006/0235901 A1* 10/2006 Chan ...................... H04L 47/11  
(Continued)

FOREIGN PATENT DOCUMENTS

JP 2003-323397 A 11/2003

OTHER PUBLICATIONS

Indian Office Action dated Jun. 17, 2021, issued in Indian Patent Application No. 201841037099.  
(Continued)

*Primary Examiner* — Eric Cardwell  
(74) *Attorney, Agent, or Firm* — Jefferson IP Law, LLP

(57) ABSTRACT

Accordingly the embodiments herein provide a method for adaptive data transfer in a memory system (140), the method comprising: receiving at least one of a data copy request and a data transfer request to perform at least one of a data copy and a data transfer form a first memory subsystem (142) to a second memory subsystem (144). Configuring the memory system (140) in one of a first memory mode and a second memory mode based on a time required to perform at least on of data transfer and data transfer from the first memory subsystem (142) to the second memory subsystem (144) using an enhanced system model and performing at least one of data transferring and data copying from the first memory subsystem (142) to the second memory subsystem (144) in  
(Continued)

one of the first configured memory mode and the second configured memory mode.

14 Claims, 3 Drawing Sheets

(56) References Cited

U.S. PATENT DOCUMENTS

| 2013/0246721 | A1  |  9/2013 | Fukutomi et al. |           |
|--------------|-----|---------|-----------------|-----------|
| 2013/0262538 | A1* | 10/2013 | Wegener ........ | H03M 7/30 |
|              |     |         |                 | 708/203   |
| 2017/0153820 | A1* |  6/2017 | Hasegawa ...... | G06F 3/065 |

OTHER PUBLICATIONS

Flavio Pisani et al., 'High-speed zero-copy data transfer for DAQapplications', Journal of Physics: Conference Series 608 (2015), 2015, URL: https://iopscience.iop.org/article/10.1088/1742-6596/608/1/012028/pdf.

* cited by examiner

[Fig. 1]
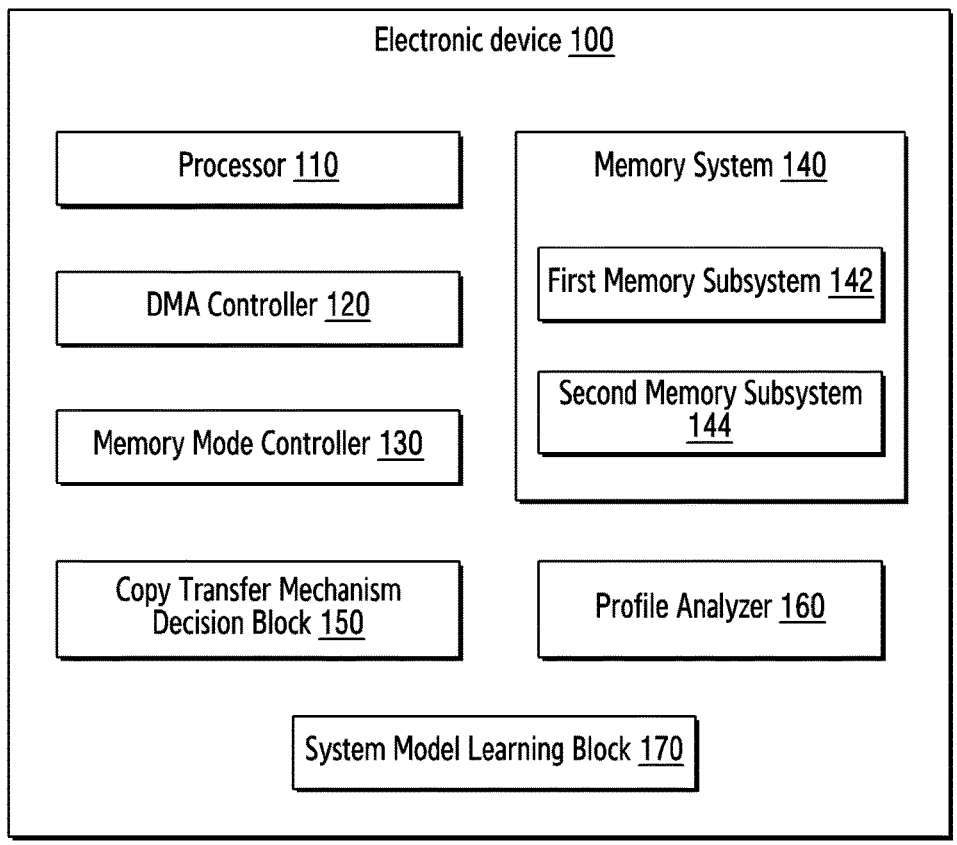
[Fig. 2]
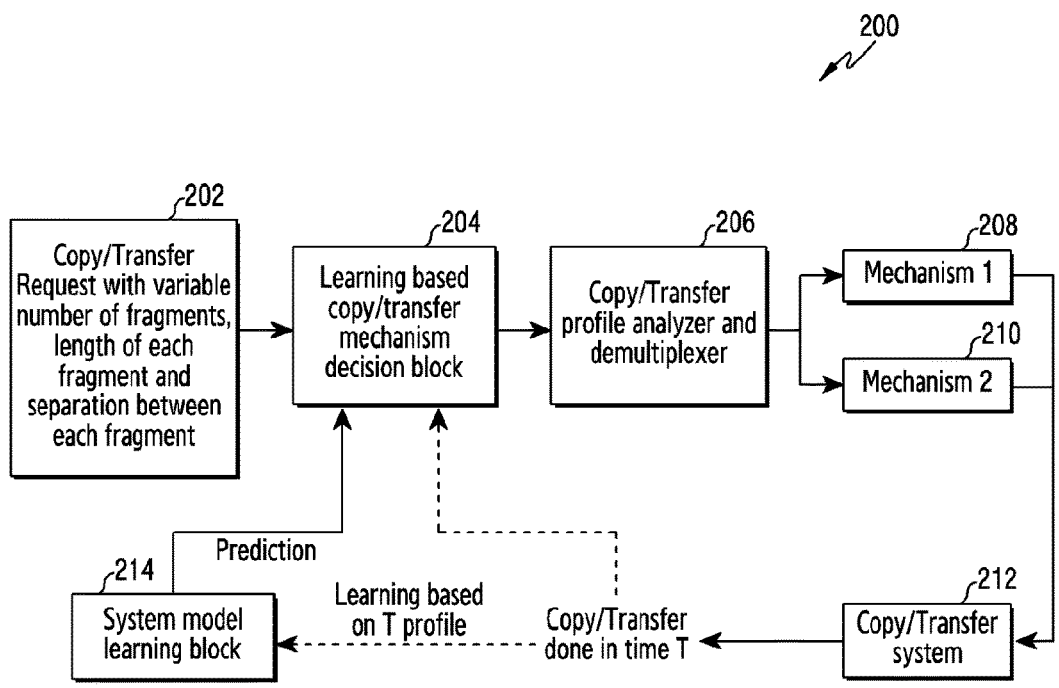

[Fig. 3]
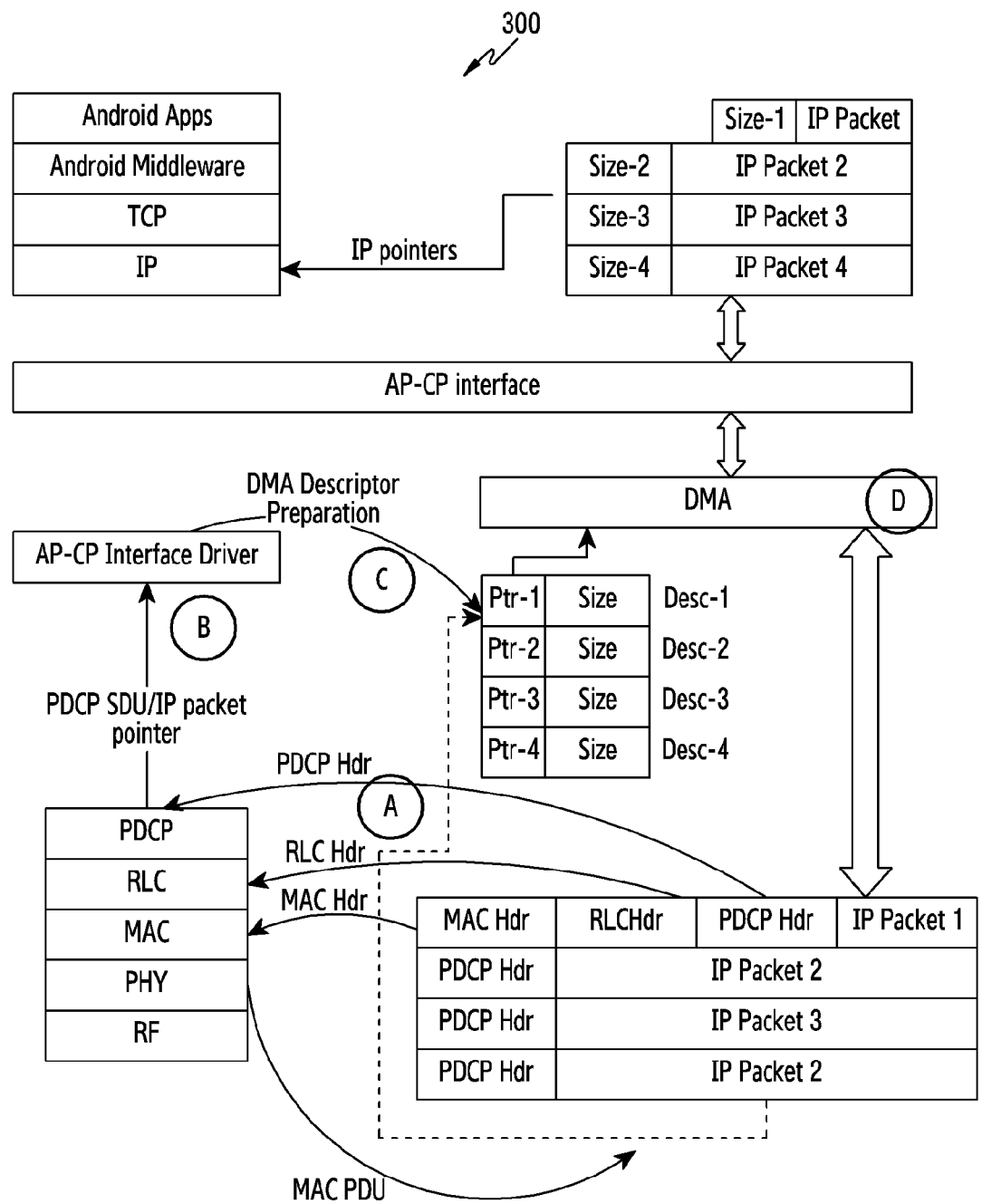

[Fig. 4]
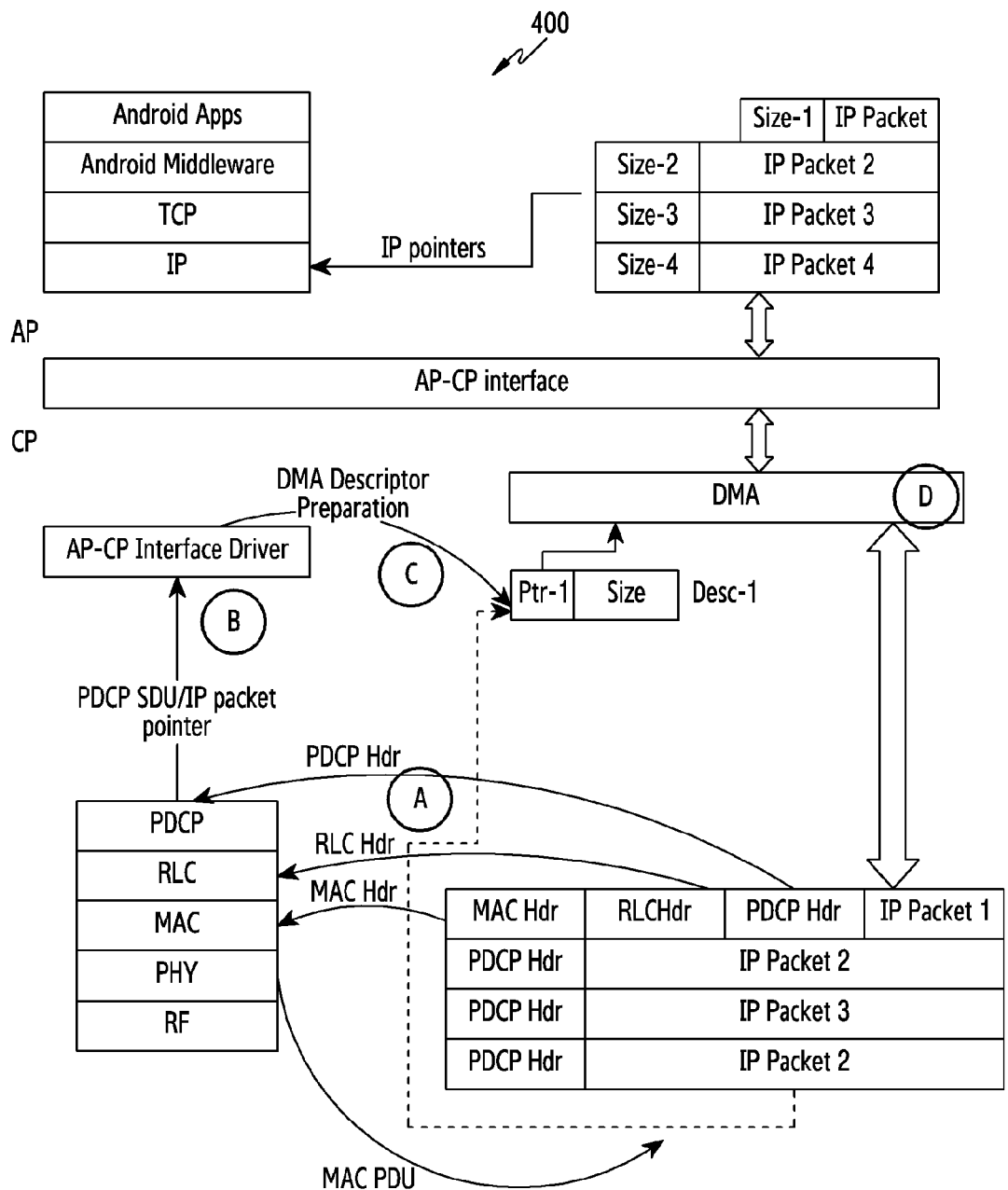

METHOD AND APPARATUS FOR ADAPTIVE DATA TRANSFER IN A MEMORY SYSTEM

TECHNICAL FIELD

The disclosure relates to a data copy and/or transfer method, and more specifically to a method and system for an adaptive data copy and/or transfer in a memory system.

BACKGROUND ART

The generic data copy/transfer operation in a memory system requires two steps: In step 1 the metadata for each fragment is process and the data is prepared for copying. In step 2 the actual data copying is done. The data to be transferred/copied is comprised of number of fragments. The fragment is the smallest unit of contiguous byte to be copied/transferred. A length of the data is the summation of the total no. of fragments in the data. A Meta data is associated with each fragment. Hence, the total time taken to copy the data is a function of number of fragments (N) and total length of data copied (L). However the throughput achieved with the existing methods is less than the desired throughput.

Thus, it is desired to address the above mentioned disadvantages or other shortcomings or at least provide a useful alternative.

DISCLOSURE OF INVENTION

Technical Problem

An embodiment herein is to provide a method for adaptive data transfer in a memory system.

Another embodiment herein is to choose an efficient method for data copy/transfer based on the results of a learning block.

Another embodiment herein is to configure the memory system in one of a first memory mode and a second memory mode based on a time required to transfer/copy the data from the first memory subsystem to the second memory subsystem.

Solution to Problem

Accordingly, the embodiments herein disclose a method for for adaptive data transfer in a memory system of an electronic device. The method includes receiving, by the memory system at least one of a data copy request and a data transfer request to perform at least one of a data copy and a data transfer form a first memory subsystem to a second memory subsystem wherein the at least one of the data copy request and the data transfer request comprises a number of data fragments and metadata information of the data fragments.

Further, the method includes configuring the memory system in one of a first memory mode and a second memory mode based on a time required to perform at least on of data transfer and data transfer from the first memory subsystem to the second memory subsystem using an enhanced system model. Further, the method includes performing, at least one of data transferring and data copying, by the memory system the data from the first memory subsystem to the second memory subsystem in one of the first configured memory mode and the second configured memory mode.

In an embodiment, configuring the memory system in one of the first memory mode and the second memory mode based on the time required to perform one of the data transfer and data copy from the first memory subsystem to the second memory subsystem comprises determining, by the memory system, a time required to perform at least one of the data transfer and the data copy from the first memory subsystem to the second memory subsystem in a first memory mode based on the metadata information of the data fragments, at least one of copy profile information and a transfer profile information and the enhanced system model for the performing at least one of the data copy operation and the data transfer operation. The configuring further includes determining, by the memory system, a time required to perform one of data transfer and data copy the from the first memory subsystem to the second memory subsystem in a second memory mode based on the number of data fragments, the metadata information of the data fragments, at least one of the copy profile information and the transfer profile information and the enhanced system model for performing at least one of the data copy operation and the data transfer operation. The configuring further includes comparing, by the memory system, the time required to perform at least one of the data transfer and data copy in the first memory mode with the time required to perform at least one of the data transfer and the data copy in the second memory mode using the enhanced system model.

Further the memory system is configured in the first memory mode when the time required to perform at least one of the data transfer and data copy in the first memory mode is less than the time required to perform at least one of the data transfer and data copy in the second memory mode. The memory system is configured in the second memory mode when the time required to perform at least one of the data transfer and data copy in the first mode is greater than the time required to perform at least one of the data transfer and data copy in the second memory mode.

In an embodiment, the first memory subsystem is a central processor (CP) and second the memory subsystem is an application processor (AP).

In an embodiment, the meta-data comprises information related to the data fragments, such as the length of the data fragment and distance between the data fragments.

In an embodiment, the plurality of contextual parameters comprises user trait data, content characteristics, and a metadata.

In an embodiment, performing at least one of data transfer and data copy from the first memory subsystem to the second memory subsystem in the first configured memory mode comprises processing each of the data fragments along with the meta data information related in a set of data packets, where each of the data fragments are non-contiguous and are separated by at least one protocol stack header. Performing at least one of data transfer and data copy from the first memory subsystem to the second memory subsystem in the first configured memory mode further comprises creating a direct memory access (DMA) descriptor for each of the data packet and performing at least one of transfer and copy of each of the data packet from the first memory subsystem to the second memory system.

In an embodiment, performing at least one of data transfer and data copy from the first memory subsystem to the second memory subsystem in the second configured memory mode comprises processing each of the data fragments by accumulating each of the data fragments along with the meta data information related to each of the data fragments into a single data packet, wherein each of the data fragments are contiguous data fragments formed by replacing each of the data frames by a size of subsequent data fragment. The at least one of data transfer and data copy from the first memory subsystem to the second memory subsystem in the second configured memory mode further comprises creating a direct memory access (DMA) descriptor for each of the single data fragment and performing at least one of data transfer and data copy of the single data fragments along with the meta data information related to each of the data fragments from the first memory subsystem to the second memory system.

Accordingly, the embodiments herein disclose an electronic device with a memory system, for adaptive data transfer. The electronic device comprises a processor, a first memory system connected to the processor, a direct memory access (DMA) controller operationally connected to the first memory subsystem and the second memory subsystem, a memory mode controller, operationally connected to the DMA controller, the first memory subsystem and the second memory subsystem.

The electronic device is configured to receive at least one of a data copy request and a data transfer request to perform at least one of data transfer and data copy from the first memory subsystem to the second memory subsystem, of the memory system, wherein the data copy and data transfer request comprises a number of data fragments and meta data information of the data fragments. The electronic device is further configures the memory system in one of a first memory mode and a second memory mode based on a time required to perform at least one of data transfer and data copy from the first memory subsystem to the second memory subsystem. Further the electronic device is configured to perform at least one of data transfer and data copy the data from the first memory subsystem to the second memory subsystem in one of the first configured memory mode and the second configured memory mode.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Advantageous Effects of Invention

Various embodiments of the present disclosure provide a data transfer scheme that is more effective.

BRIEF DESCRIPTION OF DRAWINGS

This system and method is illustrated in the accompanying drawings, throughout which like reference letters indicate corresponding parts in the various figures. The embodiments herein will be better understood from the following description with reference to the drawings, in which:

FIG. 1 is a bock diagram of an electronic device 100 for adaptive data transfer in a memory system, according to the embodiments as disclosed herein;

FIG. 2 is a flow diagram of the proposed method illustrating the data transfer/copy operation based on the time taken by different mechanisms, according to the embodiments as disclosed herein;

FIG. 3 is a flow diagram illustrating a method for data transfer/copy using a first mechanism, according to the embodiments as disclosed herein; and FIG. 4 is a flow diagram illustrating a method for data transfer/copy using a first mechanism, according to the embodiments as disclosed herein.

BEST MODE FOR CARRYING OUT THE INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly, the embodiments herein disclose a method for adaptive data transfer in a memory system of an electronic device. The method includes receiving, by the electronic device, a data copy/transfer request to copy/transfer data form a first memory subsystem to a second memory subsystem, of the memory system. The data copy/transfer request comprises a number of data fragments and meta-data information of the data fragments. Further, the method includes configuring, by the electronic device, the memory system in one of a first memory mode and a second memory mode based on a time required to transfer/copy the data from the first memory subsystem to the second memory subsystem. Further, the method includes transferring/copying, by the electronic device, the data from the first memory subsystem to the second memory subsystem in one of the first configured memory mode and the second configured memory mode. The data copy/transfer request relates to at least one of data transfer request and a data copy request.

Unlike conventional methods and systems, the proposed method ensures better utilization of all the cores of the multi-core processor environment. The method also provides a higher throughput than the conventional methods for data transfer/copy in memory system. Further the proposed method provides an enhanced packet delivery overhead.

The method can be used to enrich the content by adding supplementary information to augment the content. Further, the method can be used to analyze the enriched content based on user's interests and preferences. Further, the method can be used to generate representations for the content through a personalized renderer created based on user behavior traits, liking and aesthetic sense.

The method can be used to dynamically choose between different mechanisms for data transfer/copy in a memory system depending upon the time required for data transfer/copy. This results in achieving better results in terms of throughput of the multiple cores of the multi-core processor.

Referring now to the drawings, and more particularly to FIG. 1 through 4, where similar reference characters denote corresponding features consistently throughout the figures, there are shown preferred embodiments.

FIG. 1 is a block diagram of an electronic device 100 for adaptive data transfer/copy in the memory system according to the embodiments as disclosed herein. The electronic device 100 can be, for example, but not limited to a smart social robot, a smart watch, a cellular phone, a smart phone, a personal digital assistant (PDA), a tablet computer, a laptop computer, a music player, a video player, an Internet of things (IoT) device or the like. The electronic device 100 includes a processor 110, a direct memory access controller (DMA) 120, a memory mode controller 130, a memory system 140, a system model learning block 150, a profile analyzer 160 and a copy transfer mechanism decision block 150.

The processor 110 is coupled with the DMA controller 120, the memory mode controller 130, and the memory system 140. The processor 110 is configured to execute instructions stored in the memory system 140 and to perform various processes. In an embodiment, the memory system 140 includes a first Memory Subsystem 142 and a second memory subsystem 144.

In an embodiment, the processor 110 receives a data transfer request and/or data copy request from the first memory subsystem 142 to transfer and/or copy data to the second memory subsystem 144. The data transfer and/or copy request comprises a number of data fragments and meta-data information of the data fragments. The fragment is the smallest unit of contiguous byte of data to be copied and/or transferred. A length of the data is the summation of the total no. of fragments in the data. A metadata is associated with each fragment. The metadata information relative to each fragment may be for example but not limited to a length of each data fragment and separation between every consecutive data fragment.

The memory mode controller 130 after receiving the data copy request and/or transfer request, configures the memory system 140 in one of a first memory mode and a second memory mode based on a time required to transfer/copy the data from the first memory subsystem 142 to the second memory subsystem 144.

The copy transfer mechanism decision block 150, determines the time required for data transfer and/or copy for the first mechanism and the second mechanism. The copy transfer mechanism decision block 150 determines the mechanism to be used for execution of the data transfer/copy request. The mechanism for execution of the data transfer/copy request is one of the first mechanism and the second mechanism.

In an embodiment the copy transfer mechanism decision block 150 determines a time required to transfer/copy the data from the first memory subsystem 142 to the second memory subsystem 144 for the first memory mode and the second memory mode using the system model of memory copy/transfer operation or any other relevant method (like lookup tables etc.). The first memory mode represents the first mechanism for data transfer/copy from and the second memory mode the first memory subsystem 142 to the second memory subsystem 144. The second memory mode represents the second mechanism for data transfer/copy from and the second memory mode the first memory subsystem 142 to the second memory subsystem 144.

In an embodiment the copy transfer mechanism decision block 150 compares the time required for data copy/transfer for the first memory mode with the time required for data copy/transfer for the first memory mode. Based on the comparison of the required time for data copy/transfer for the first and second memory mode, the memory mode controller 130 configures the memory system into the memory mode which requires less time for data transfer/copy operation.

After configuring the memory system into one of the first memory made and second memory mode, the processor 110 transfers/copies the data from the first memory subsystem to the second memory subsystem in one of the memory mode based on the memory mode configuration of the memory system.

Although the FIG. 1 shows various hardware components of the electronic device 100 but it is to be understood that other embodiments are not limited thereon. In other embodiments, the electronic device 100 may include less or more number of components. Further, the labels or names of the components are used only for illustrative purpose and does not limit the scope of the invention. One or more components can be combined together to perform same or substantially similar function to provide personalized response.

FIG. 2 is a flow diagram 200 illustrating a method for learning based adaptive data transfer/copy between memory subsystems in the memory system 140. The operations (202-216) are performed by the various elements of the electronic device 100. At 202, the method includes receiving by the processor 110 the request for data transfer/copy from the first memory system 142 to the second memory system 144. The data transfer/copy request comprises the information relating to the data fragments and the metadata associated with the data fragments. At 204, the method includes determining the mechanism for data transfer/copy based on the feedback provided by the system model learning block 150. At 206, the method includes providing a profile for accumulation of packets by the profile analyzer 160. The profile provided by the profile analyzer 160 is a list containing chunks of fragments that have to be accumulated and fragments which will be copied/transferred individually. The chunks of fragments represent the first mechanism for data/copy transfer by collating the data fragments and sending them as a single fragment. The second mechanism for data transfer/copy corresponds to sending the data fragments individually along with the metadata.

At 208 the memory mode controller 130 configures the memory system 140 into the first memory mode, thereby choosing the first mechanism for data transfer and/or data copy. In another embodiment, at 210 the memory mode controller 130 configures the memory system 140 into the second memory mode, thereby choosing the second mechanism for data transfer/copy.

At 212 the processor 110, performs the actual data transfer/copy operation based on the memory mode configured by the memory mode controller 130.

At 214 the system model learning block 150 receives the profile generated at 206, and the time taken in actual copy/transfer operation and uses it to estimate or enhance the existing estimate of the system model for the data copy/transfer operation by using techniques like regression, other ML based techniques etc. In another embodiment, the system model learning block 150 may also use the information to create/modify/enhance other relevant options like lookup tables etc. which can be used to select between first memory mode and second memory mode. In an example scenario the system model learning block provides some initial guess for the system model. This initial system model is used to select the appropriate memory mode for data copy/transfer operations. With every data copy/transfer operation, the learning block receives new information about the profile generated at 206, and the time taken in actual copy/transfer operation. It uses the received information to improve its estimate of the system model and indicate the new system model to the copy/transfer mechanism decision block which can be used to select the memory modes at 204. The loop is continued till the estimation process of system model has converged. After this the calculated system model can be used for selecting between alternate memory modes.

The various actions, acts, blocks, steps, or the like in the flow diagram 300 may be performed in the order presented, in a different order or simultaneously. Further, in some embodiments, some of the actions, acts, blocks, steps, or the like may be omitted, added, modified, skipped, or the like without departing from the scope of the invention.

FIG. 3 is a flow diagram 300 illustrating the method for data transfer/copy using a first mechanism, according to the embodiments as disclosed herein. FIG. 3 shows an example data transfer scenario from a physical layer of the electronic device 100 to the Application layer. The physical layer refers to the communication processor (CP) and the application layer refers to the application processor (AP). The arrows in FIG. 3 from bottom to top, depicts a medium access control (MAC) layer protocol data unit (PDU) preparation, header processing at each layer, direct memory access (DMA) descriptor preparations and IP packet transfer to AP. The IP packets in each MAC PDU are not contiguous, and are separated by protocol stack headers. The protocol stack headers are MAC header, a radio link control header (RLC Hdr) and a packet data convergence protocol (PDCP) header. An example of single MAC PDU in downlink is shown in FIG. 3. The following procedures takes place during PDCP layer processing. At A four PDCP headers are processed. At B four position pointers and size of four noncontiguous IP packets are found, and shared to Interface driver. Then at C four DMA descriptors are prepared by Driver. At (D) DMA has to scan four Descriptors and make transfer four chunks from CP to AP memory. As seen from the example each data fragment is copied separately along with the metadata information separately.

FIG. 4 is a flow diagram 400 illustrating a method for data transfer/copy using a second mechanism, according to the embodiments as disclosed herein. FIG. 4 describe, PPS (Processing packets Per Second) at steps B, C and D is reduced hence avoiding bottlenecks and enhancing throughput. IP packets in each MAC PDU (or TB), are not contiguous, separated by protocol stack headers (MAC, RLC, and PDCP): an example of single MAC PDU in DL is shown. During PDCP layer processing, Firstly (A) 4 PDCP headers are processed, each PDCP header 20 replaced by Size (Size-1, Size-2, Size-3, Size-4) of subsequent IP Packet (PDCP SDU). Next, (B) 1 pointer (Pointing to first PDCP Header/Size-1) total size of contiguous memory chunk as shown. Next, (C) only 1 DMA descriptors is prepared by driver. Next, (D) DMA has to scan 1 Descriptors and make transfer 1 contiguous memory chunk from CP to AP memory. As seen from the example above the contiguous fragments are copied as a single large chunk.

The embodiments disclosed herein can be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for adaptive data transfer and performed by an electronic device including a memory system comprising a first memory subsystem and a second memory subsystem, the method comprising:
   receiving at least one of a data copy request and a data transfer request to perform at least one of a data copy and a data transfer of data fragments from the first memory subsystem to the second memory subsystem;
   identifying one of a first memory mode and a second memory mode based on an estimated time required to perform at least one of the data copy and the data transfer, by using a system model;
   performing at least one of the data copy and the data transfer of the data fragments according to one of the first memory mode and the second memory mode; and
   storing a time taken during the at least one of the data copy and the data transfer for updating the system model.

2. The method of claim 1, wherein the identifying further comprises:
   identifying a first estimated time required to perform at least one of the data copy and the data transfer according to the first memory mode based on metadata information for the data fragments, at least one of copy profile information and transfer profile information, and the system model;
   identifying a second estimated time required to perform at least one of the data copy and the data transfer according to the second memory mode based on a number of the data fragments, the metadata information, at least one of the copy profile information and the transfer profile information, and the system model;

identifying the first memory mode, in case that the first estimated time is less than the second estimated time; and identifying the second memory mode, in case that the first estimated time is greater than the second estimated time.

3. The method of claim 1,
wherein the at least one of the data copy request and the data transfer request comprises a number of the data fragments and metadata information for the data fragments, and
wherein the metadata information comprises a length of the data fragments and a distance between the data fragments.

4. The method of claim 2, wherein an initial system model is selected for the system model, and the initial system model is optimized for identifying the first estimated time and the second estimated time.

5. The method of claim 3, wherein the performing at least one of the data copy and the data transfer according to the first memory mode comprises:
processing each of the data fragments individually according to the metadata information to form a set of data packets, wherein each of the data fragments is noncontiguous and is separated by at least one protocol stack header;
generating a direct memory access (DMA) descriptor for each of the data packets; and
performing at least one of the data copy and the data transfer from the first memory subsystem to the second memory subsystem for each of the data packets.

6. The method of claim 3, wherein the performing at least one of the data copy and the data transfer according to the second memory mode comprises:
processing each of the data fragments according to the metadata information by accumulating the data fragments into a singled data packet, wherein the data fragments are with or without a separation between them;
generating a DMA descriptor for the single data packet; and
performing at least one of the data copy and the data transfer from the first memory subsystem to the second memory subsystem for the single data packet including the data fragments.

7. The method of claim 1, wherein the identifying further comprises:
selecting an initial system model;
selecting one of the first memory mode and the second memory mode, based on the estimated time obtained by using the initial system model;
obtaining information associated with an actual time required for performing at least one of the data copy and the data transfer based on the selected memory mode; and
selecting the system model based on the obtained information, configuration parameters of the memory system, and data stored in a learning block associated with the data fragments.

8. An electronic device for adaptive data-transfer, the electronic device comprising:
at least one processor;
a memory system comprising a first memory subsystem and a second memory subsystem;
a direct memory access (DMA) controller electrically connected to the first memory subsystem and the second memory subsystem; and a memory mode controller electrically connected to the DMA controller, and the memory system, storing one or more computer programs including instructions configured to be executed by the at least one processor, wherein the one or more computer programs include instructions to:
receive, by the at least one processor, at least one of a data copy request and a data transfer request to perform at least one of a data copy and a data transfer of data fragments from the first memory subsystem to the second memory subsystem,
identify, by the memory mode controller, one of a first memory mode and a second memory mode based on an estimated time required to perform at least one of the data copy and the data transfer, by using a system model,
perform, by the at least one processor, at least one of the data copy and the data transfer of the data fragments according to one of the first memory mode and the second memory mode, and
store a time taken during the at least one of the data copy and the data transfer for updating the system model.

9. The electronic device of claim 8, wherein the one or more computer programs further include instructions to:
identify a first estimated time required to perform at least one of the data copy and the data transfer according to the first memory mode based on metadata information for the data fragments, at least one of copy profile information and transfer profile information, and the system model,
identify a second estimated time required to perform at least one of the data copy and the data transfer according to the second memory mode based a number of the data fragments, the metadata information, at least one of the copy profile information and the transfer profile information, and the system model,
identify the first memory mode, in case that the first estimated time is less than the second estimated time, and
identify the second memory mode, in case that the first estimated time is greater than the second estimated time.

10. The electronic device of claim 9, wherein an initial system model is selected for the system model, and the initial system model is optimized for identifying the first estimated time and the second estimated time.

11. The electronic device of claim 8,
wherein the at least one of the data copy request and the data transfer request comprises a number of the data fragments and metadata information for the data fragments, and
wherein the metadata information comprises a length of the data fragments and a distance between the data fragments.

12. The electronic device of claim 11, wherein the one or more computer programs further include instructions to:
process each of the data fragments individually according to the metadata information to form a set of data packets, wherein each of the data fragments is noncontiguous and is separated by at least one protocol stack header,
generate a direct memory access (DMA) descriptor for each of the data packets, and
perform at least one of the data copy and the data transfer from the first memory subsystem to the second memory subsystem for each of the data packets.

13. The electronic device of claim 11, wherein the one or more computer programs further include instructions to:
process each of the data fragments according to the metadata information by accumulating the data fragments into a singled data packet, wherein the data fragments are with or without a separation between them,
generate a DMA descriptor for the single data packet, and
perform at least one of the data copy and the data transfer from the first memory subsystem to the second memory subsystem for the single data packet including the data fragments.

14. The electronic device of claim 8, wherein the one or more computer programs further include instructions to:
select an initial system model,
select one of the first memory mode and the second memory mode, based on the estimated time obtained by using the initial system model,
obtain information associated with an actual time required for performing at least one of the data copy and the data transfer based on the selected memory mode, and
select the system model based on the obtained information, configuration parameters of the memory system, and data stored in a learning block associated with the data fragments.

* * * * *